United States Patent
Li et al.

(10) Patent No.: US 9,413,932 B2
(45) Date of Patent: Aug. 9, 2016

(54) CAMERA MODULE HAVING EFFICIENT ELECTROMAGNETIC SHIELDING

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Yong Li, Shenzhen (CN); Shin-Wen Chen, New Taipei (TW); Shu-Sheng Peng, Shenzhen (CN); Jun-Hui Yu, Shenzhen (CN); Dai-Peng Zhu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 18 days.

(21) Appl. No.: 14/516,873

(22) Filed: Oct. 17, 2014

(65) Prior Publication Data
US 2015/0281528 A1    Oct. 1, 2015

(30) Foreign Application Priority Data
Mar. 26, 2014    (CN) .......................... 2014 1 0115713

(51) Int. Cl.
*H04N 5/225*    (2006.01)
*G03B 13/34*    (2006.01)

(52) U.S. Cl.
CPC .............. *H04N 5/2252* (2013.01); *G03B 13/34* (2013.01); *H04N 5/2253* (2013.01); *H04N 5/2254* (2013.01)

(58) Field of Classification Search
None
See application file for complete search history.

(56) References Cited

U.S. PATENT DOCUMENTS

| | | | |
|---|---|---|---|
| 2011/0130177 A1* | 6/2011 | Halliday | 455/575.1 |
| 2012/0147258 A1* | 6/2012 | Park | 348/374 |
| 2013/0003010 A1* | 1/2013 | Yu | 349/200 |
| 2013/0076924 A1* | 3/2013 | Wade et al. | 348/208.11 |
| 2013/0119785 A1* | 5/2013 | Han | 310/12.16 |
| 2013/0222914 A1* | 8/2013 | Han | 359/557 |
| 2014/0043496 A1* | 2/2014 | Azuma | 348/208.7 |
| 2014/0063821 A1* | 3/2014 | Hegde et al. | 362/382 |
| 2014/0294376 A1* | 10/2014 | Kim et al. | 396/535 |

* cited by examiner

*Primary Examiner* — Shahbaz Nazrul
(74) *Attorney, Agent, or Firm* — ScienBiziP, P.C.

(57) ABSTRACT

A camera module includes a voice coil motor, a lens module, a substrate, an imagine sensor, a circuit board and a conductive adhesive tape. The voice coil motor includes a conductive housing defining a first hole. The lens module is received in the first hole. The substrate supports the voice coil motor and defines a second hole. The circuit board includes a grounding area. The image sensor is supported by the circuit board, and is received in the second hole, and aligned with the lens module. The conductive adhesive tape covers the substrate and electrically connects the conductive housing to the grounding area.

20 Claims, 2 Drawing Sheets

CAMERA MODULE HAVING EFFICIENT ELECTROMAGNETIC SHIELDING

FIELD

The present disclosure relates to a camera module.

BACKGROUND

Camera modules include electronic components and need an electromagnetic shielding function to avoid electromagnetic interference. Conventionally, the camera module employs an additional metal housing for electromagnetic shielding, which makes the structure of the camera module complex.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
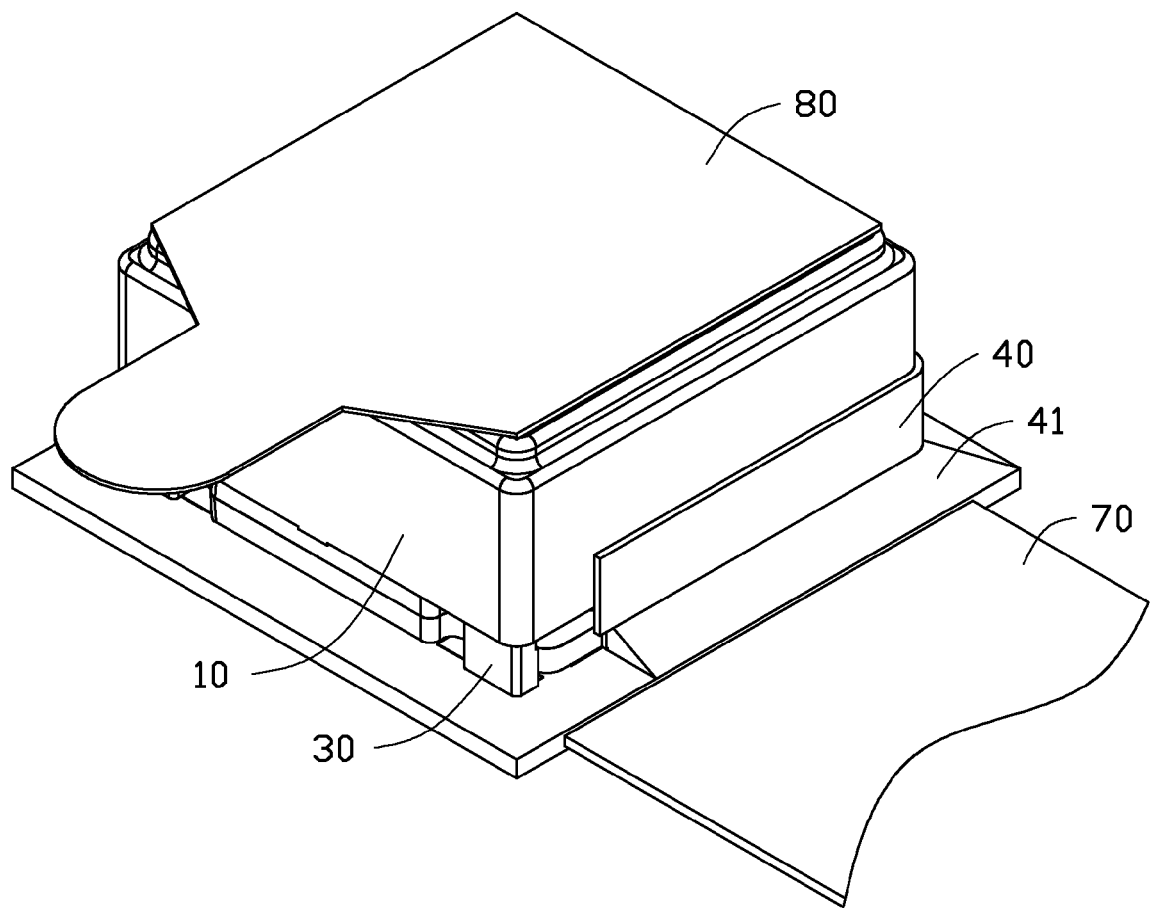
FIG. 1 is an isometric view of a camera module according to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
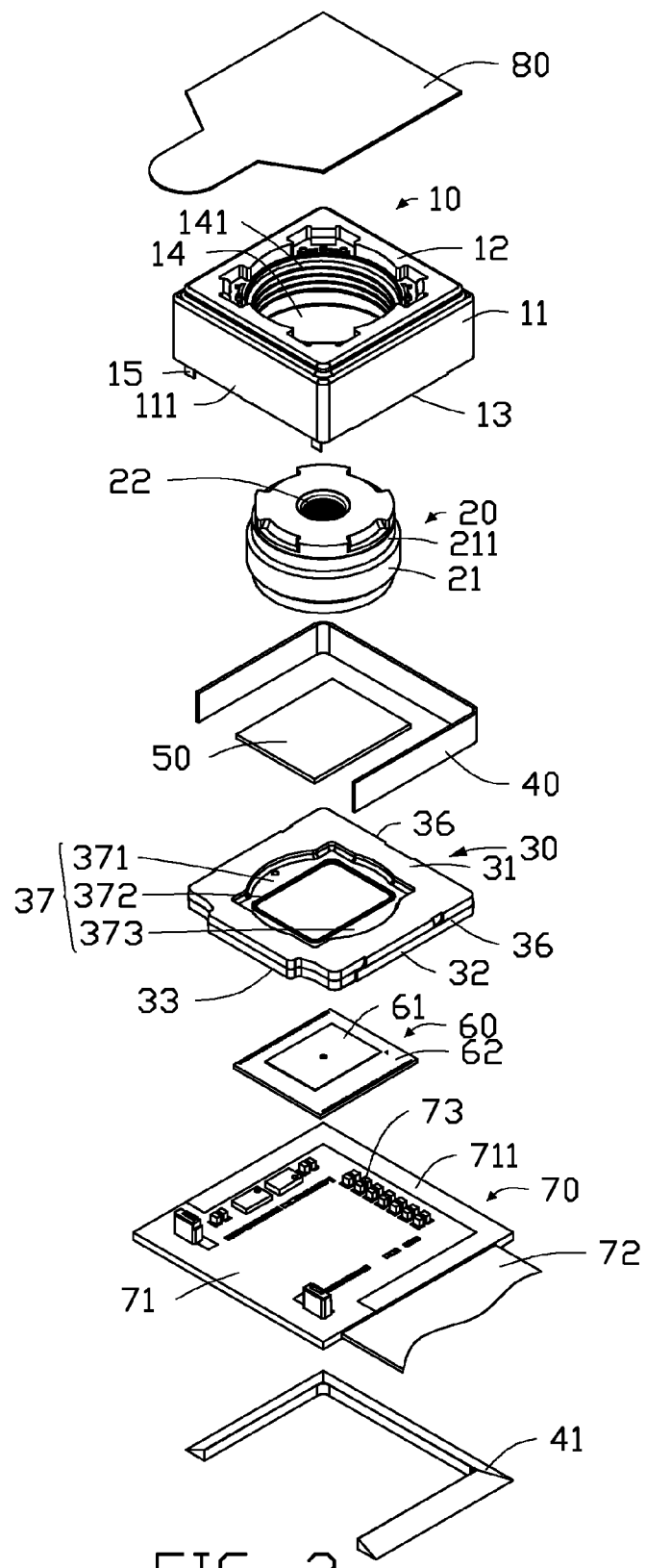
FIG. 2 is an exploded view of the camera module of FIG. 1.

The present disclosure is described in relation to FIGS. 1 and 2.

FIGS. 1 and 2 illustrate a camera module. The camera module includes a voice coil motor 10, a lens module 20, a substrate 30, a conductive adhesive tape 40, a filter 50, an image sensor 60, a circuit board 70 and a protective cover 80.

The voice coil motor 10 can be substantially a cubic, and include a conductive housing 11. The conductive housing 11 can include a first surface 12, a second surface 13 opposite to the first surface 12, and a first side surface 111 perpendicularly connected to the first surface 12 and the second surface 13. The conductive housing 11 can be made of electromagnetic shield material, for example Fe—Ni alloy, conductive plastic, conductive glass, and surface conductive material.

The housing 11 defines a first hole 14 through the first and second surfaces 12, 13. The first hole 14 receives the lens module 20. An inner thread 141 is formed on the inner wall of the first hole 14. The housing 11 further includes a pair of pins 15 extending from the second surface 13. The pins 15 surround the first hole 14 and are adjacent to the first side wall 111. The pins 15 are electrically connected to the circuit board 70 by tin soldering ball or conductive glue.

The voice coil motor 10 is fixed to the substrate 30 by heat curable glue. In other embodiments, the voice coil motor 10 can also be fixed to the substrate by other means, such as tin paste.

The voice coil motor 10 can also include other components, for example a coil and magnet, as the structure of the voice coil motor 10 is familiar to those skilled in the art, thus, a detailed description to the voice coil motor 10 is omitted here.

The voice coil motor 10 can be configured to drive the lens module 20 to move to adjust a focal distance of the lens module 20.

The lens module 20 can be substantially cylindrical, and include a barrel 21 and at least two lenses 22 received in the barrel 21. The barrel 21 has an outer thread 211 formed on an outer surface. The outer thread 211 is engaged with the inner thread 141 of the voice coil motor 10.

The substrate 30 is made of plastic, the substrate 30 is a substantially rectangular plate, and includes a top surface 31, a bottom surface 32 opposite to the top surface 31, second, third, fourth, and fifth side surfaces 33, 34, 35, and 36 perpendicularly connected to the top and bottom surfaces 31, 32. The second side surface 33, which is stepped defines two concave corners for receiving the pins 15.

The substrate 30 defines a rectangular second hole 37 through the top surface 31 and the bottom surface 32. The second hole 37 is a stepped hole, and is divided by a hollow support part 372 projected in the second hole 37 to a small upper hole 371 adjacent to the top surface 31, and a big bottom hole 373 adjacent to the bottom surface 32. The support part 372 supports the filter 50. The upper hole 371 receives a bottom part of the lens module 20.

The conductive adhesive tape 40 is substantially U-shaped, fully covers the third, fourth, and fifth side surfaces 34, 35, and 36 of the substrate 30, and partially covers the conductive housing 11.

In this embodiment, the conductive adhesive tape 40 is electrically connected to the circuit board 70 by tin paste 41.

The filter 50 is received in the upper hole 371 and is aligned with the lens module 20.

The image sensor 60 includes an optical part 61 and a non-optical part 62. The image sensor 60 is received in the bottom hole 373, and the optical part 61 is aligned with the filter 50.

The image sensor 60 is fixed on the circuit board 70. The image sensor 60 can be a charge coupled device (CCD) or a complementary metal oxide semiconductor (CMOS).

The circuit board 70 includes a support part 71 and a connecting part 72. The support part 71 includes a grounding area 711 electrically connected to the conductive adhesive tape 40 via the tin paste 41. The support part 71 supports a plurality of electronic components 73 received in the bottom hole 373. The connecting part 72 is a flexible circuit board for connecting the camera module to other devices.

The protective cover 80 fully covers the lens module 20 for protecting the lens module 20.

The conductive housing 11 is grounded through the conductive adhesive tape 40 and the grounding area 711 of the circuit board 70, and therefore the camera module has an electromagnetic shield function. Thus, the camera module does not need additional metal housing for electromagnetic shielding, and the structure of the camera module is simplified.

It will be understood that the above particular embodiments are shown and described by way of illustration only. The principles and the features of the present disclosure can be employed in various and numerous embodiments thereof without departing from the scope of the disclosure. The above-described embodiments illustrate the scope of the disclosure but do not restrict the scope of the disclosure.

What is claimed is:

1. A camera module comprising:
    a voice coil motor having a conductive housing, said housing having a plurality of side surfaces and shaped to define a first hole;
    a lens module positioned substantially within the first hole;
    a substrate, said substrate having a plurality of sides and shaped to define a second hole;
    a circuit board;
    an image sensor with an optical part; and
    conductive adhesive tape;
    wherein, the substrate is positioned between the voice coil motor housing and the circuit board;
    wherein, the circuit board has a grounding area and the conductive adhesive tape is positioned along a portion of the plurality of the side surfaces of the voice coil motor housing and extends to cover a portion of the substrate sides electrically connecting the voice coil motor housing with the grounding area;
    wherein, the optical part is aligned with the lens module; and
    wherein the lens module has a bottom part received in the second hole of the substrate.

2. The camera module of claim 1, wherein the voice coil motor further comprises at least one pin electrically connected to the circuit board.

3. The camera module of claim 1, further comprising a filter received in the second hole between the lens module and the image sensor.

4. The camera module of claim 1, further comprising a protective cover fully covering the lens module.

5. The camera module of claim 1, wherein the conductive housing forms an inner thread on an inner wall of the first hole, the lens module comprising a barrel, the barrel forms an outer thread engaged with the inner thread.

6. The camera module of claim 1, wherein the conductive adhesive tape is electrically connected to the grounding area by tin paste.

7. The camera module of claim 1, wherein the conductive housing is made of electromagnetic shield material.

8. A camera module comprising:
    a voice coil motor having a conductive housing, said housing having a plurality of side surfaces and shaped to define a first hole;
    a lens module positioned substantially within the first hole;
    a substrate, said substrate having a plurality of sides and shaped to define a second hole;
    a circuit board; and
    conductive adhesive tape;
    wherein, the substrate is positioned between the voice coil motor housing and the circuit board;
    wherein, the circuit board has a grounding area and the conductive adhesive tape is positioned along a portion of the plurality of the side surfaces of the voice coil motor housing and extends to cover a portion of the substrate sides electrically connecting the voice coil motor housing with the grounding area; and
    wherein the lens module has a bottom part received in the second hole of the substrate.

9. The camera module of claim 8, wherein the voice coil motor further comprises at least one pin electrically connected to the circuit board.

10. The camera module of claim 8, further comprising a filter received in the second hole.

11. The camera module of claim 8, further comprising a protective cover fully covering the lens module.

12. The camera module of claim 8, wherein the conductive housing forms an inner thread on an inner wall of the first hole, the lens module comprising a barrel, the barrel forms an outer thread engaged with the inner thread.

13. The camera module of claim 8, wherein the conductive adhesive tape is electrically connected to the grounding area by tin paste.

14. The camera module of claim 8, wherein the conductive housing is made of electromagnetic shield material.

15. The camera module of claim 1, wherein the second hole is divided by a hollow support part to an upper hole and a bottom hole.

16. The camera module of claim 15, wherein the support part supports a filter, the upper hole receiving the bottom part of the lens module, the image sensor being received in the bottom hole.

17. The camera module of claim 15, wherein the upper hole has a diameter less than that of the bottom hole.

18. The camera module of claim 8, wherein the second hole is divided by a hollow support part to an upper hole and a bottom hole.

19. The camera module of claim 18, wherein the support part supports a filter, the upper hole receiving the bottom part of the lens module, the image sensor being received in the bottom hole.

20. The camera module of claim 18, wherein the upper hole has a diameter less than that of the bottom hole.

* * * * *